(12) United States Patent
Walter et al.

(10) Patent No.: US 10,532,891 B2
(45) Date of Patent: Jan. 14, 2020

(54) TRANSPORT ROUTE OF A LONG STATOR LINEAR MOTOR

(71) Applicant: B&R INDUSTRIAL AUTOMATION GMBH, Eggelsberg (AT)

(72) Inventors: Dominic Walter, Salzburg (AT); Christoph Obermair, Salzburg (AT); Stefan Huber, Salzburg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 16/197,934

(22) Filed: Nov. 21, 2018

(65) Prior Publication Data

US 2019/0161284 A1 May 30, 2019

(30) Foreign Application Priority Data

Nov. 24, 2017 (EP) ..................................... 17203506

(51) Int. Cl.
*B65G 37/00* (2006.01)
*B65G 15/30* (2006.01)
*B65G 54/02* (2006.01)

(52) U.S. Cl.
CPC ............. *B65G 37/00* (2013.01); *B65G 15/30* (2013.01); *B65G 2201/02* (2013.01)

(58) Field of Classification Search
None
See application file for complete search history.

(56) References Cited

U.S. PATENT DOCUMENTS

| 4,749,921 A * | 6/1988 | Chitayat ............... H02K 41/031 |
| | | 310/12.24 |
| 9,923,444 B2 * | 3/2018 | Kleinikkink ....... H02K 41/0358 |
| 2003/0230941 A1 * | 12/2003 | Jacobs .................... B60L 15/38 |
| | | 310/12.19 |
| 2011/0125307 A1 | 5/2011 | Dickson et al. |
| 2015/0083018 A1 | 3/2015 | Clark |

(Continued)

FOREIGN PATENT DOCUMENTS

| EP | 3 202 611 | 8/2017 |
| EP | 3 243 772 | 11/2017 |

OTHER PUBLICATIONS

Europe Office Action conducted in counterpart Europe Appln. No. 17203506.5 (dated Mar. 14, 2018).

*Primary Examiner* — Kavel Singh
(74) *Attorney, Agent, or Firm* — Greenblum & Bernstein, P.L.C.

(57) ABSTRACT

For a flexibly configurable and easily expandable transport route of a long stator linear motor with transport route modules, it is provided that, in a two-sided route section with a transport route module on both sides, an intermediate space is provided between two transport route modules in transverse direction, and the transport unit is arranged at least partially in this intermediate space. In this way, a movement path is formed midway of this intermediate space in transverse direction that the transport unit follows during movement in longitudinal direction by the guidance on the transport route modules, and the movement path is arranged by the arrangement of the transport route module in transverse direction at a distance of (r·a) from the starting point and ending point, where r is an odd, whole number.

5 Claims, 5 Drawing Sheets

(56) References Cited

U.S. PATENT DOCUMENTS

2017/0050332 A1\* 2/2017 Bauer ..................... B26D 7/32
2017/0225900 A1 8/2017 Radak
2017/0320683 A1 11/2017 Walter et al.

\* cited by examiner

TRANSPORT ROUTE OF A LONG STATOR LINEAR MOTOR

CROSS-REFERENCE TO RELATED APPLICATIONS

The present application claims priority under 35 U.S.C. § 119(a) of European Patent Application No. EP 17203506.5 filed Nov. 24, 2017, the disclosure of which is expressly incorporated by reference herein in its entirety.

BACKGROUND OF THE INVENTION

1. Field of the Invention

The present invention relates to a transport route of a long stator linear motor along which a transport unit of the long stator linear motor is movable in longitudinal direction, wherein the transport route is formed by at least two transport route modules that are arranged adjacent to each other in longitudinal direction, wherein each of the at least two transport route modules forms a guiding side on a side of the transport route module lying in a transverse direction oriented transverse to the longitudinal direction and the transport unit is mounted in a guided manner on the guiding side and is arranged to be movable in longitudinal direction, and wherein the transport route is formed with a single-sided route section having transport route modules on only one side and/or a two-sided route section having transport route modules on both sides and wherein in a two-sided route section the guiding sides of transport route modules are arranged on the two sides facing each other and wherein the at least two transport route modules each have on the respective guiding side a starting point and an ending point, each of which is situated on a grid corner point of a (a×a) grid.

2. Discussion of Background Information

Long stator linear motors are often used as flexible conveying devices in production, machining and assembly systems as well as in similar systems. A long stator linear motor is essentially made up, in a known way, of a long stator in the form of a plurality of drive coils arranged in succession on a stationary structure and of a plurality of transport units having excitation magnets (permanent or electro-magnets) that are moved along the long stator. For this purpose, the drive coils are energized with an electrical current by application of an electrical voltage. A magnetic field that is moved in longitudinal direction along the long stator and works together with the excitation magnets on a transport unit in order to move the transport unit according to the known motor principle is generated by a suitable energizing of the drive coils. A transport route along which the transport units can be moved is thus formed by the long stator. Thus, it is possible to move each transport unit individually and independently of each other (position, speed, acceleration, direction of travel). To do this, each drive coil is driven by an associated drive coil controller, which can receive presettings for the movement of a transport unit (e.g. in the form of setpoint values for position or speed) from a higher-level system control unit and calculates the control variables for the drive coils, in particular coil currents. Switches of the long stator linear motor can also be provided along the transport route at which there is a splitting into different transport routes or a merging of different transport routes. A conveying device in the form of a long stator linear motor can therefore have very complex track designs.

Often, the long stator or a transport route is also made up of individual, joined transport route modules, wherein the transport route modules are arranged adjacent to each other in the direction of travel. By virtue of this modularity, a long stator motor can be designed more easily, especially if defined transport route modules are used. The structural design of the long stator linear motor, that is, for example, the design of the drive coils, the conveyor sections, the transport units, the guides of the transport unit, etc. can, of course, be different, whereas the basic functional principal of a long stator linear motor remains the same. However, the selection and geometry of the transport route modules is not at all trivial. In principle, one wants to be able to flexibly produce a wide variety of transport routes with as few transport route modules as possible.

Moreover, a transport route can also have one-sided route sections with transport route modules on only one side and/or have two-sided route sections with transport route modules on both sides. This is known, for example, from U.S. 2015/0083018 A1. Such two-sided route sections occur, for example, if high propulsive forces are required along a certain route, or else also if the transport route has a plurality of transport paths (also as closed loop) that are adjacent to each other on a two-sided route section. Also in the region of a switch, two-sided route sections can occur. As a result, however, the possible complexity of the transport route of a long stator linear motor is increased even further, which further increases the desire for a simple but flexible realization.

SUMMARY OF THE EMBODIMENTS

Embodiments provide a transport route of a long stator linear motor with transport route modules that flexibly and easily enable an expandability in order to be able to produce a wide variety of transport routes of very diverse complexity.

According to embodiments, an intermediate space is provided in a two-sided route section between two transport route modules in a transverse direction, and the transport unit is arranged at least partially in this intermediate space, whereby a movement path is formed midway of this intermediate space in transverse direction that the transport unit follows during movement in longitudinal direction by the guidance on the transport route modules and the movement path is arranged by the arrangement of the transport route module in transverse direction at a distance of (r·a) from the starting point and ending point, where r is an odd, whole number. With this arrangement, it can be ensured that the movement path of the transport route can be aligned with a fixed grid and also that the transport route modules fit into this grid. Thus, the transport route can be expanded in the grid with other such transport route modules. The grid also ensures that a closed transport path can always be produced using the transport route modules if only such transport route modules are used. This also greatly simplifies the planning of a transport route.

Advantageously, on transport route modules a plurality of drive coils is arranged adjacent to each other in longitudinal direction, wherein the installation width of a drive coil in longitudinal direction corresponds to the grid length. Thus, the transport route modules can easily be strung together in longitudinal direction.

With this scheme, a straight transport route module, a transport route module as a 90° curve and a transport module as a 180° curve can be produced, each with an outward or inward guiding side. With these transport route modules, almost any transport path can be produced.

BRIEF DESCRIPTION OF THE DRAWINGS

The present invention is explained below with reference to FIGS. 1 to 9, showing exemplary, schematic and non-restrictive advantageous embodiments of the invention. Shown are

DETAILED DESCRIPTION OF THE EMBODIMENTS

Figure 1:
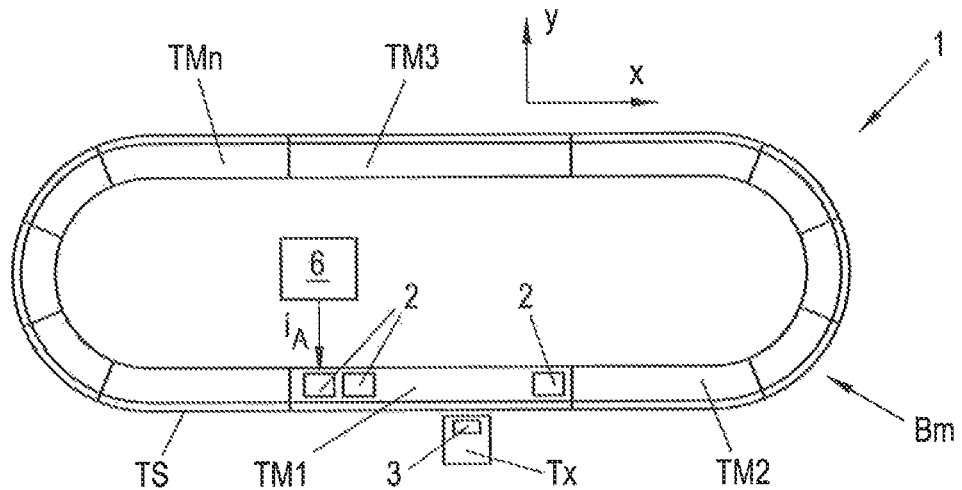
FIG. 1 illustrates a simple transport route of a long stator linear motor.

A simple example of a long stator linear motor 1 is illustrated in FIG. 1. The long stator linear motor 1 is designed with a transport path Bm in the form of a closed transport route TS. The transport route TS is formed from a number n>1 of transport route modules TMn that are arranged stationarily adjacent to each other in longitudinal direction x. The longitudinal direction x thus corresponds to the movement direction of a transport unit Tx along the transport route TS. At a curve, the longitudinal direction x is consequently the tangent to the transport path Bm. The direction transverse to the longitudinal direction x is referred to as transverse direction y.

The transport unit Tx is mounted in a guiding manner on the transport route TS or on the individual transport route module TMn and is movable in longitudinal direction x. A transport unit Tx typically cannot move in transverse direction y because of the guide. Therefore, there is preferably a restricted guidance in longitudinal direction x.

Arranged on a transport route module TMn, preferably adjacent to each other in longitudinal direction x, is a plurality of drive coils 2 (in FIG. 1, only a few drive coils 2 are indicated), that are energized under the control of a control unit 6 (illustrated only for a drive coil 7) by application of a coil voltage with coil current $i_A$ in order to generate a moving magnetic field. At least one transport unit Tx is moved along the transport route TS in this way. However, the drive coils 2 can also be arranged stationarily in another suitable manner. The transport unit Tx is guided on the stationarily arranged transport route TS. Moreover, at least one excitation magnet 3, preferably a permanent magnet or an arrangement of permanent magnets, that cooperates with the generated, moving magnetic field for the movement of the transport unit Tx along transport route TS, is arranged on the transport unit Tx. Of course, more than one transport unit Tx can be moved along the transport route TS, wherein each transport unit Tx can be moved (in direction, position, speed and acceleration) by corresponding energization of the drive coils 2 in the region of transport unit Tx independently of the other transport units Tx. This functional principle of a long stator linear motor 1 is well known, so that it will not be further discussed at this point.

Figure 2:
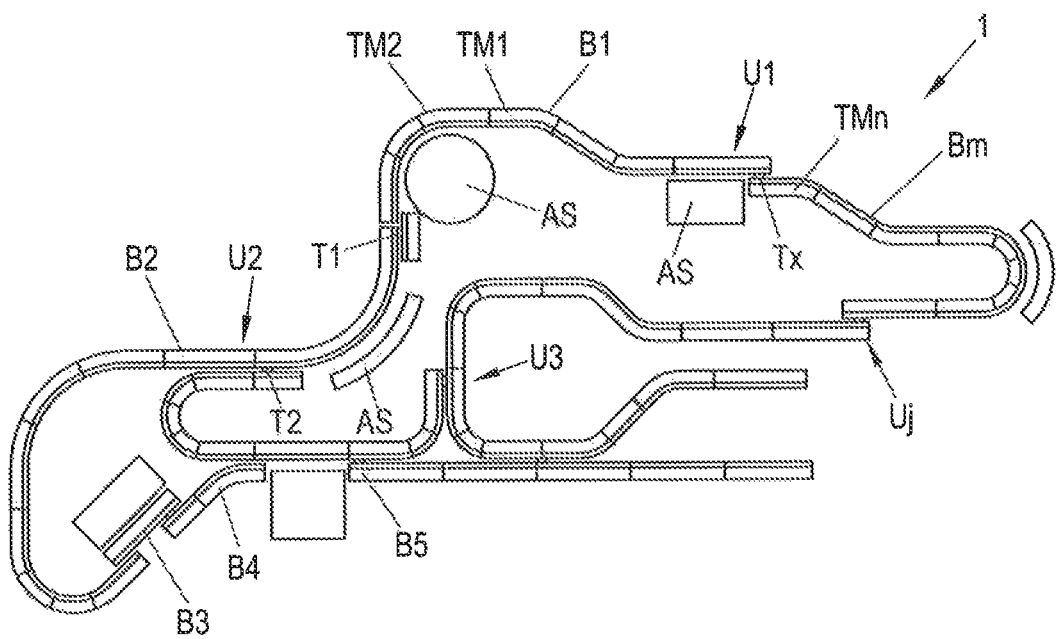
FIG. 2 illustrates a more complex transport route of a long stator linear motor.

Of course, there can also be regions along transport route TS at which on both sides of a transport unit Tx (seen in the direction of movement) a transport route module TMn is provided, possibly with drive coils 2, as indicated in FIG. 2. In this case, the transport unit Tx, seen in transverse direction y, preferably also has at least one excitation magnet 3 on both sides.

Depicted in FIG. 2 is a long stator linear motor 1 of more complex design, wherein for the sake of clarity the depiction of the drive coils 2 and the excitation magnets 3 is omitted. In this embodiment, the transport route TS comprises a plurality of transport paths Bm, m>1 (for the sake of clarity, not all transport paths are designated) that collectively form the transport route TS of the long stator linear motor 1. The transport route TS, or a transport path Bm thereof, is thus formed again from various transport route modules TMn. A transport unit Tx, x≥1 can be moved along the transport route TS on different transport paths Bm. The individual transport paths Bm are connected to each other by transfer points Uj, j>1 (also in this case, not all transfer points Uj are designated) at which the transport paths Bm partially overlap in longitudinal direction x. A transfer point Uj can be designed as a switch, such as the transfer points U2, U3, but can also be designed as a simple changeover from one transport path Bm to another transport path Bm in a two-sided route section, such as transfer points U1, Uj. At a switch, the route divides into different transport paths Bm or there is a merging of different transport paths Bm.

Different work stations AS at which a transport unit Tx can be moved through or also be stopped can also be arranged along the transport path Bm. In the workstations AS, any manipulations can be carried out on components that are moved with a transport unit Tx, or components can be loaded or unloaded. A workstation AS can also be designed for the loading or unloading of transport units Tx in a transport route TS.

Figure 3:
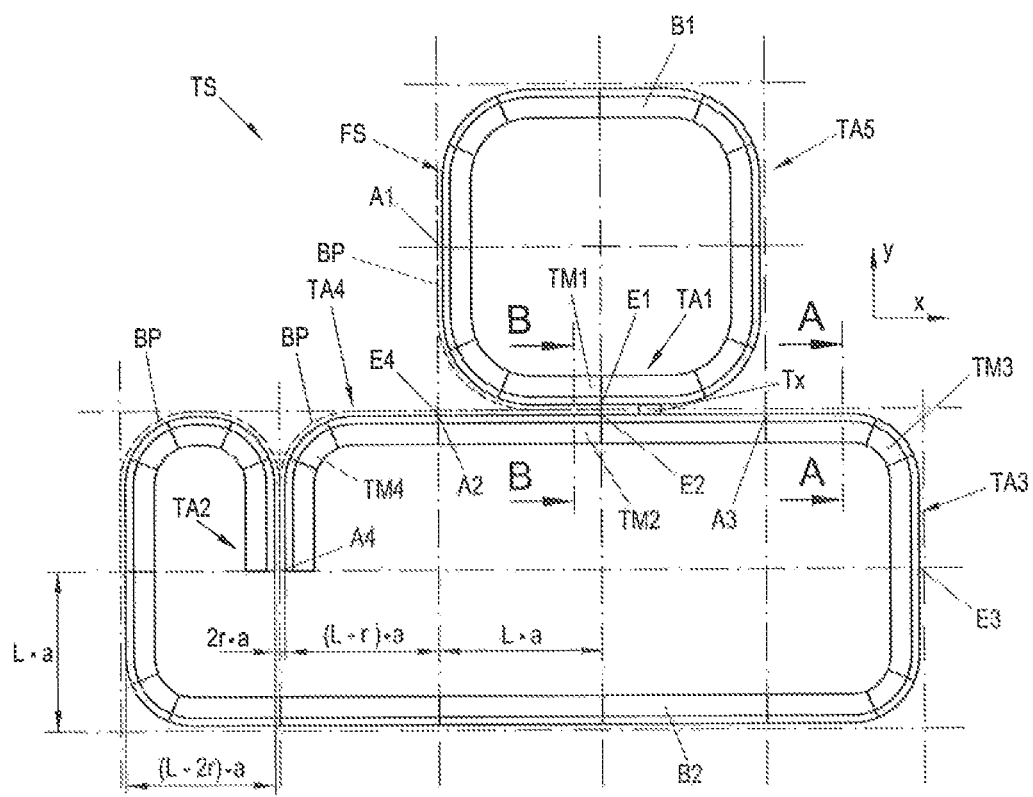
FIG. 3 illustrates a transport route according to the invention of a long stator linear motor in the set grid with one-sided and two-sided route sections.

In order to be able to design a transport route TS of a long stator linear motor 1 simply yet flexibly, the geometry and the arrangement of the transport route modules TMn are determined according to a fixed scheme, as explained based on FIG. 3.

The transport route TS according to FIG. 3 comprises two transport paths B1, B2. The two transport paths B1, B2 are arranged adjacent to each other, as seen in transverse direction y, in a two-sided route section TA1 so that transport section modules TMn of both transport paths B1, B2 are arranged adjacent to each other. Likewise, the second transport path B2 comprises a route section TA2 along which transport route modules TMn of the second transport path B2 are arranged next to each other in transverse direction y. In addition, the transport route TS also comprises single-sided transport sections TA3, TA4, TA5, along which transport route modules TMn are arranged only on one side (as seen in transverse direction y).

Figure 4:
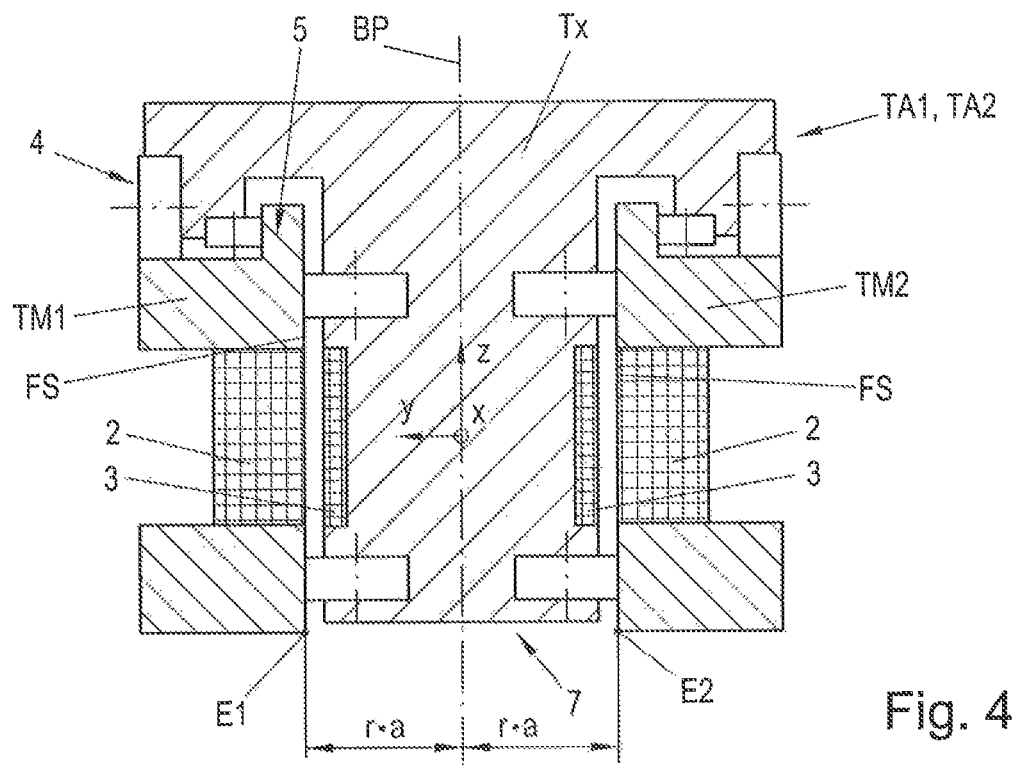
FIG. 4 illustrates a cross-section through the transport route of a two-sided route section.
Figure 5:
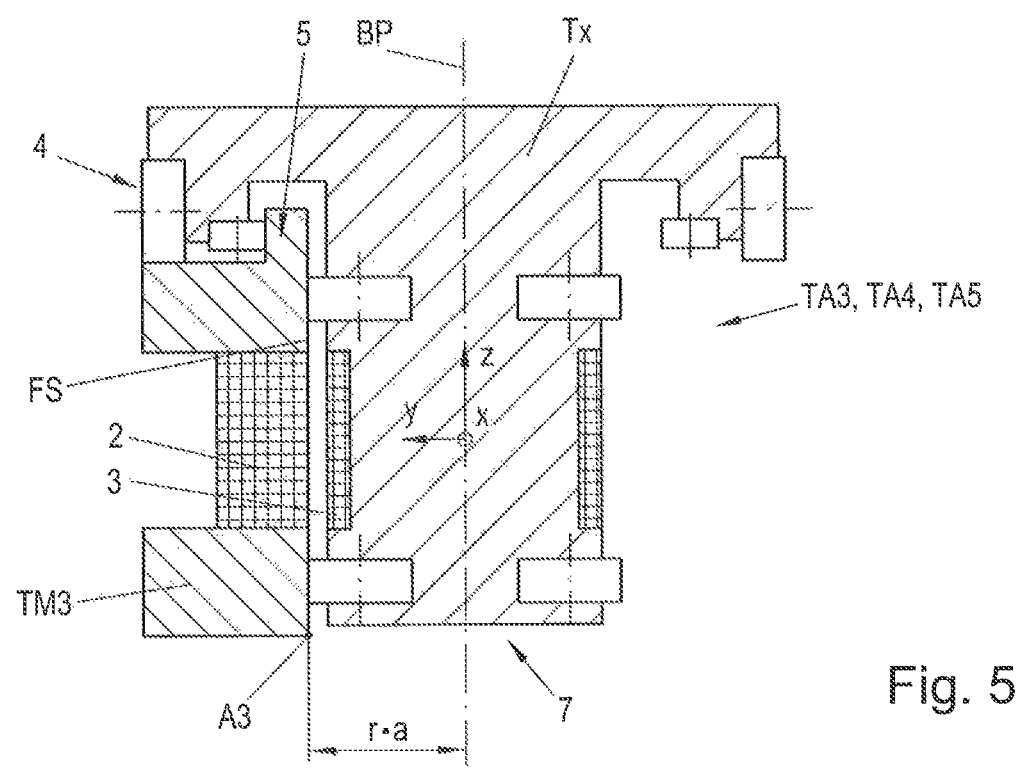
FIG. 5 illustrates a cross-section through the transport route of a single-sided route section.

FIG. 4 shows a cross-section (section B-B) through a two-sided route section TA1, TA2 and FIG. 5 shows a cross-section (section A-A) through a one-sided route section TA3 in order to illustrate this difference. In a two-sided route section TA1, TA2, transport route modules TM1, TM2 are arranged in transverse direction y on both sides. In a one-sided route section TA3. TA4, TA5, by contrast, only on one side. In FIGS. 4 and 5, guide elements 4, 5 are also indicated on transport unit Tx and on transport route modules TMn that cooperate in order to keep the transport unit Tx on the transport route module TMn and guide it in longitudinal direction x. Guide elements 4, 5 can be designed however desired, for example as rollers, wheels, sliding surfaces, magnetic guides, etc.

In transverse direction y, an intermediate space 6 in which the transport unit Tx is at least partially arranged is produced in a two-sided route section TA1, TA2 between the transport route modules TM1, TM2 arranged adjacent to each other. Midway of the intermediate space 6 (seen in transverse direction y), a movement path BP is formed that the transport unit Tx follows during movement in longitudinal direction x along the transport path Bm by the guiding on the transport route modules TMn. The movement path BP is partially indicated in FIG. 3 by a dotted line. By virtue of the predetermined guidance of the transport unit Tx on the transport route modules TMn, movement path BP along the transport route TS is always at a constant distance from the transport route module TMn.

Each transport route module TMn has on one side (seen in transverse direction y) a guiding side FS, which is indicated in the figures by a double line. The transport unit Tx is guided along the guiding side FS. In a two-sided route section TA1, TA2, the guiding sides FS of the adjacently arranged transport route module TM1, TM2 are arranged facing each other.

Each transport route module TMn has a starting point An and an ending point En on the guiding side FS seen in longitudinal direction x. The transport route modules TMn are connected to form the transport route TSm in such a way that always a starting point An and an ending point En of adjacent transport route modules TMn coincide. The starting points An and ending point En are, of course, interchangeable on a transport route module TMn.

The transport route modules TMn can form any movement path BP, for example, a straight line, a 90° curve (FIG. 6) or a 180° curve (FIG. 7), or S-shaped curves. What is decisive in this is that each starting point An and ending point En of a transport route module TMn is on a grid corner point $(p \cdot a) \times (q \cdot a)$ of a $(a \times a)$ grid, wherein p and q are whole numbers and the grid length a is predetermined. A grid corner point is set as the origin from which the grid is constructed. For the sake of simplicity (but not necessarily), the origin is preferably selected in such a way that p and q for various grid corner points $(p \cdot a) \times (q \cdot a)$ do not have to change the sign. In the case of the 90° curve of FIG. 6, the starting point An of the transport route module TMn is, for example on the grid corner point with $p=q=0$ (selected origin), and the ending point En is on the grid corner point with $p=q=12$. If the origin were, for example, on the ending point En, then the starting point An of the transport route module TMn according to FIG. 6 would be, for example on the grid corner point with $p=q=-12$. For the starting point An or ending point En (when the origin is selected at $p=q=0$) of a 90° curve, the inequality $p, q \neq 0$ generally applies. If the origin is set at $p=q=0$, then the other point of a 90° curve is, for example, at $p=q$. In the case of FIG. 7, the starting point An of the transport route module TMn is, for example on the grid corner point with $p=q=0$ (selected origin), and the end point En is on the grid corner point with $p=0$, $q=12$. However, the 180° curve of FIG. 7 could, for example, also be defined in such a way that the starting point and the ending point En is on different p-coordinates. For the starting point An or ending point En of a 180° curve (if the origin is selected at $p=q=0$), it is generally true that p is a whole number and $q \neq 0$.

Figure 6:
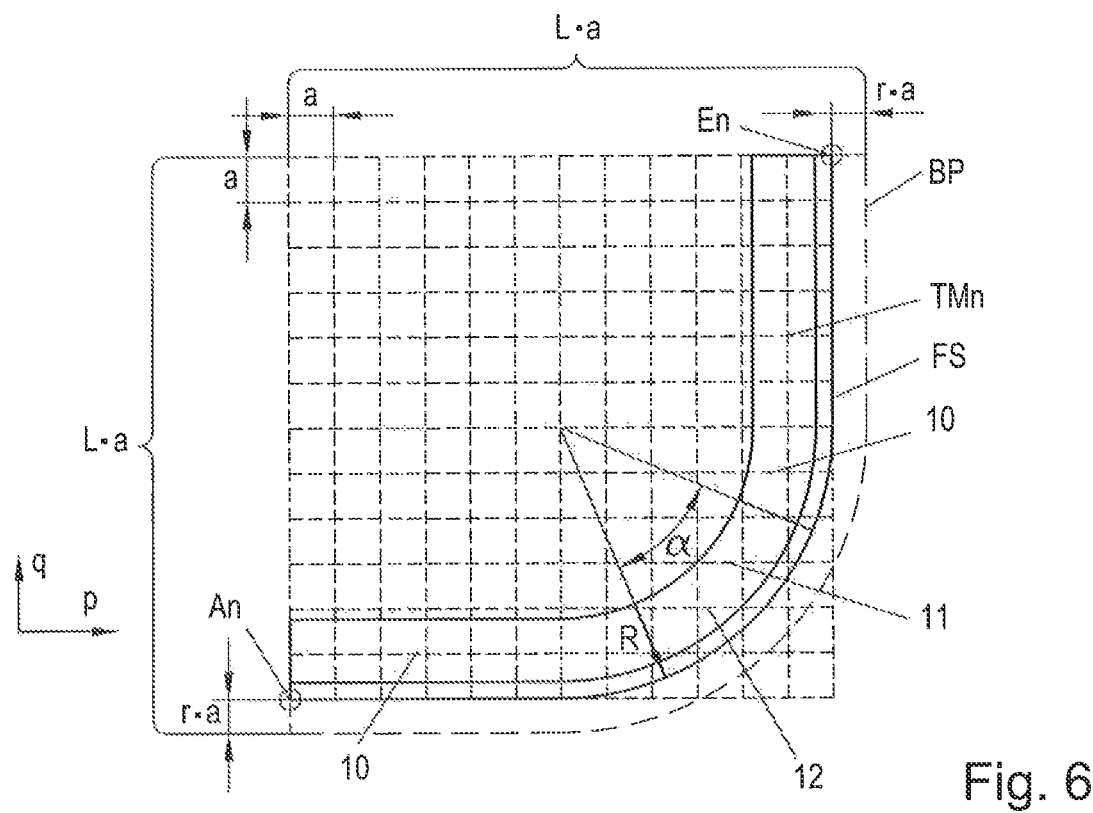
FIG. 6 illustrates a 90° transport route module with outward guiding side.
Figure 7:
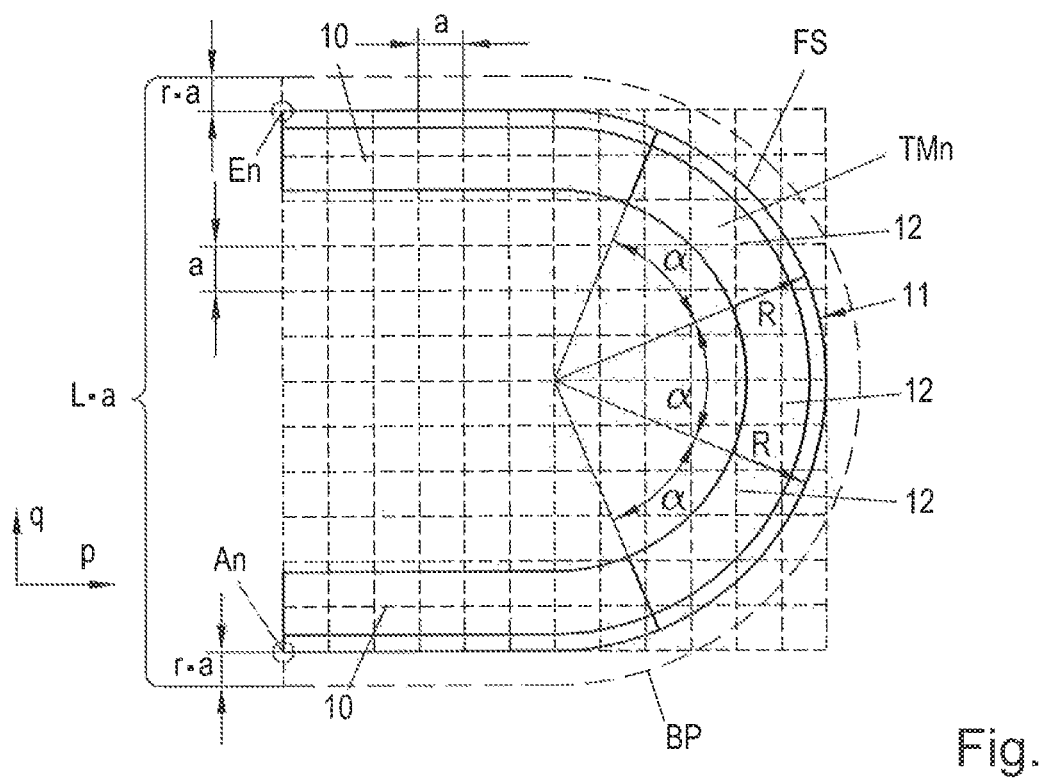
FIG. 7 illustrates a 180° transport route module with outward guiding side.

A curved transport route module TMn can also be made up from two curve entry modules 10 on which the starting point An or the ending point En is provided and at least one connection module 11, which joins the two curve entry modules 10, as depicted in FIGS. 6 and 7. This has the advantage that one can also produce different transport route modules TMn from the curve entry modules 10 with different connection modules 11. To do this, the connection module 11 itself can also be subdivided again, for example in the form of a plurality of circular segment modules 12, as illustrated in FIG. 7.

A circular segment module 12 in the form of a circular arc spans an angle of, for example, $\alpha=45°$. If the curve entry module 10 then produces an angle change of the transport route (seen in the direction of travel) of 22.5°, a 90° curve (FIG. 6) as well as a 180° curve (FIG. 7) can be produced with such curve entry modules 10 and circular segment modules 12 with arc angle $\alpha=45°$. A connection module 11 comprising three circular segment modules 12 that is connected to two curve entry modules 10 then yields a 180° curve. A connection module 11 comprising a circular segment module 12 and two curve entry modules 10 connected thereto then yields a 90° curve. Of course, other segmentations are also conceivable. For example, a 90°-angled or 135°-angled circular segment module 12 could be provided.

In this connection, it is especially advantageous if a curve entry module 10 produces an angle change in order to realize a curve from a radius of curvature of infinity (zero curvature) at one end of a curve entry module 10 to a radius of curvature R (curvature 1/R) at the other end of the curve entry module 10. It can be provided that the curvature is preferably constantly increased from zero to 1/R, for example by a curve in the form of a spline (e.g. a fifth order polynomial). If the curve were to change abruptly, then this would mean a jump in the centrifugal acceleration for a transport unit Tx that is moved along a transport route module TMn with a curve entry module 10. This would put strain on the mechanics of the transport unit Tx and/or the guide of the transport route TS and increase the wear. From this perspective, it is also advantageous if the curvature at one end of the curve entry module 10 and the curvature at one end of the connection module 11, or of a circular segment module 12, are equal, because this would also then mean no jump in the curvature of the transport route module TMn if the curve entry module 10 and the connection module 11 or the circular segment module 12 are combined. After the circular segment module 12 preferably produces a curve with radius R, the curvature at the end of the curve entry module 10 is preferably likewise 1/R.

Figure 8:
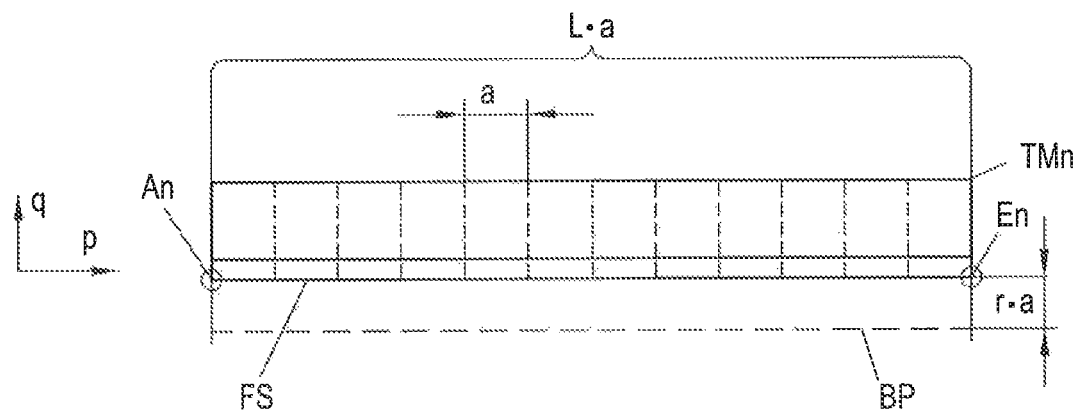
FIG. 8 illustrates a straight transport route module.

For logical reasons, a straight transport route module TMn is also defined (FIG. 8), with $p \neq 0$, $q=0$. The length of the straight transport route module TMn thus corresponds to the number of grid lengths a between starting point An and ending point En.

Each transport route module TMn could of course be turned by $\pm 90°$ or 180°, which, however, changes nothing on the above general definitions and, in particular on the $(a \times a)$ grid.

Beyond this, however, the transport route modules TMn are arranged according to the invention in such a way that the movement path BP is also on a grid corner point of the $(a \times a)$ grid. To do this, the transport route modules TMn are arranged in a two-sided route section TA1, TA2 in transverse direction y in such a way that the resulting movement path BP in transverse direction y is produced at a distance (r·a) from the starting point An, or ending point En (see, for example, FIG. 4 or 5). To this end, r is an odd whole number. In the embodiments shown in FIGS. 6 to 8, r=1 is selected, for example.

By this determination, it can be ensured that the movement path BP results on a set grid, as depicted in FIG. 3. The transport route TS is thus aligned with a grid that is specified by movement path BP.

In order to be able to construct this grid specified by the movement path BP with the transport route modules TMn, the grid coordinates p, q of the transport route modules TMn are selected as follows.

In this connection, it is started from the length (L·a) of a straight transport route module TM2. A straight transport route module TMn with origin p=q=0 would then be defined, for example, with L≠0, q=0. The length (L·a) then defines the (L·a)×(L·a) grid of the movement path BP. A 90° curve, as depicted in FIG. 6 with origin p=q=0 in the starting point An, is then selected with ending point En [(L−r)·a]×[(L−r)·a], with p=q=(L−r), and a 180° curve, as depicted in FIG. 7 with origin p=q=0 in the starting point An, consequently with ending point En 0×[(L−2r)·a], thus with p=0 and q=(L−2r). The p, q grid coordinates of other possible transport route modules TMn can be chosen starting from the length (L·a) in an analogous manner, so that the movement path, which is formed by the transport route module TMn, can be aligned on the (L·a)×(L·a) grid.

The transport route modules TMn selected in this way can of course be used in any desired orientation, for example turned 90°, 180° or 270°, which, however, changes nothing in the above definition.

Figure 9:
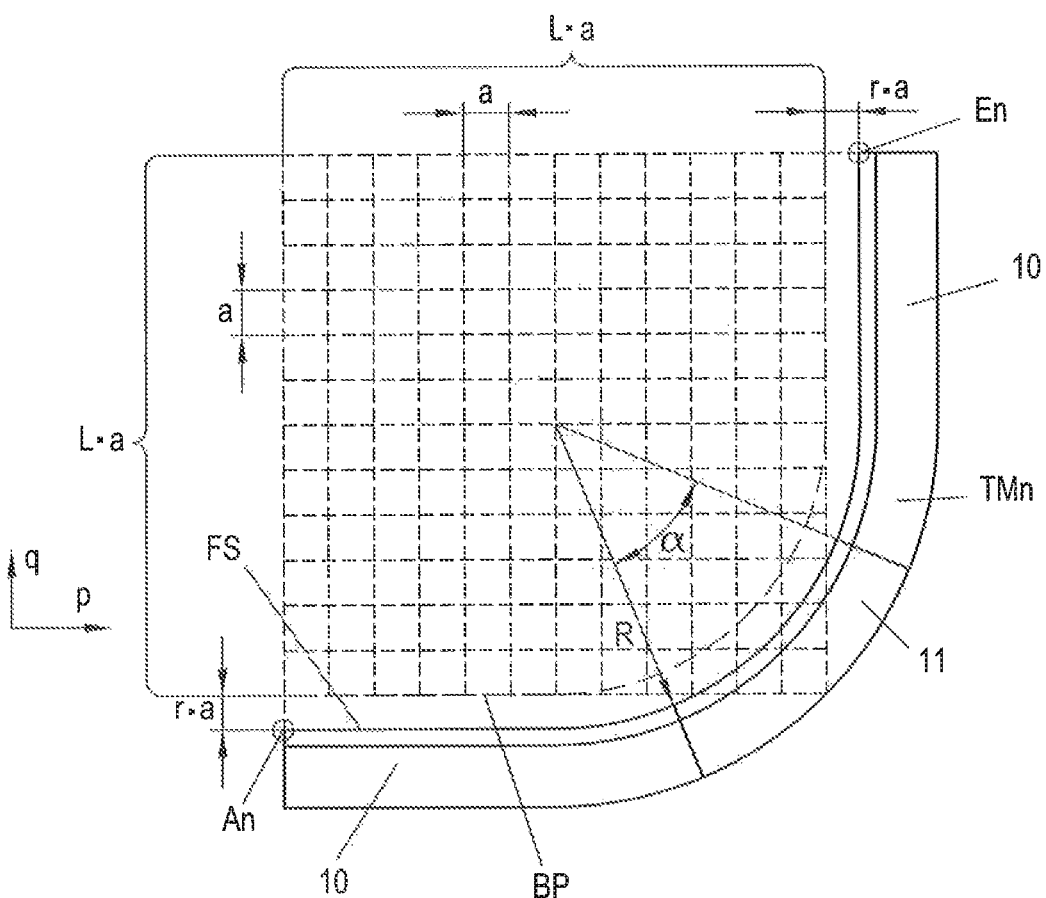
FIG. 9 illustrates a 90° transport route module with inward guiding side.

In the above examples, the guiding side FS is always provided to the outside, that is, in the region of the greater radius of curvature R. However, the guiding side FS can of course also be provided to the inside, as depicted in FIG. 9 in the example of a 90° curve. Such transport route modules TMn with inward guiding side FS can of course also be selected in such a manner that the resulting movement path BP is on the (L·a)×(L·a) grid. As a consequence, an inward 90° curve with origin p=q=0 in the starting point An is then selected with ending point En [(L+r)·a]×[(L+r)·a], with p=q=(L+r). In an analogous manner, an inward 180° curve results with starting point in the origin p=q=0 and with ending point En 0×[(L+2r)·a], that is, with p=0 and q=(L+2r). Other inward transport route modules TMn can be selected in analogous manner so that the movement path BP is on the (L·a)×(L·a) grid.

In order to create or plan the transport route TS, it is sufficient to put the required transport route modules TMn into the grid (L·a)×(L·a) that is set or that results from the movement path BP in order to form the desired transport paths Bm, which is always possible via dimensioning. Of course, inward and outward transport route modules TMn can also be combined. This makes the design of a transport route TS easier. Moreover, a transport route TS can also very easily be extended in this way with additional transport route modules TMn.

If the grid length a is set, for example, to be 15 mm, then L=44, for example, can be selected, whereby the length (L·a) of a straight transport route module TM2 with 660 mm results. The grid of the movement path BP would then be set at 660 mm×660 mm. The ending point of a 90° curve with starting point An at p=q=0 with [(L−r)·a]×[(L−r)·a] and r=1 would then have the grid coordinates 645 mm×645 mm, and the ending point En of a 180° curve the grid coordinates 0 mm×630 mm.

Very advantageously, the installation width of an drive coil 2 in longitudinal direction x on a straight transport route module TM2 can be used as grid length a, whereby the installation width of drive coil 2 determines the grid.

What is claimed:

1. A transport route of a long stator linear motor along which a transport unit of the long stator linear motor is movable in a longitudinal direction, comprising:
   at least two transport route modules that are arranged adjacent to each other in longitudinal direction, wherein each of the at least two transport route modules forms a guiding side on a side of the transport route module lying in a transverse direction oriented transverse to the longitudinal direction and the transport unit is mounted in a guided manner on the guiding side and is arranged to be movable in the longitudinal direction on the guiding side, and
   at least one of a single-sided route section having transport route modules on only one side or a two-sided route section having transport route modules on both sides, wherein, in the two-sided route section, the guiding sides of transport route modules are arranged on the two sides facing each other,
   wherein the at least two transport route modules each have on a respective guiding side a starting point and an ending point, which are situated on grid corner points of an (a×a) grid having a predetermined grid length a and grid coordinates (p, q), wherein p, q are whole numbers,
   wherein, in the two-sided route section, in a transverse direction between the at least two transport route modules, an intermediate space is provided and the transport unit is arranged at least partially in the intermediate space, whereby midway of the intermediate space in the transverse direction, a movement path is formed which the transport unit follows when moving in the longitudinal direction by the guidance on the transport route modules and the movement path is arranged by the arrangement of the transport route modules in the transverse direction at a distance of (r·a) from the starting point and ending point, wherein r is an odd, whole number,
   wherein at least one transport route module is designed as a straight transport route module with a length (L·a) having a predetermined whole, positive number L≠0.

2. Transport route according to claim 1, wherein, on the transport route modules, a plurality of drive coils are arranged adjacent to each other in longitudinal direction, and an installation width of a drive coil in the longitudinal direction corresponds to the grid length a.

3. A transport route of a long stator linear motor along which a transport unit of the long stator linear motor is movable in a longitudinal direction, comprising:
   at least two transport route modules that are arranged adjacent to each other in longitudinal direction, wherein each of the at least two transport route modules forms a guiding side on a side of the transport route module lying in a transverse direction oriented transverse to the longitudinal direction and the transport unit is mounted in a guided manner on the guiding side and is arranged to be movable in the longitudinal direction on the guiding side, and
   at least one of a single-sided route section having transport route modules on only one side or a two-sided route section having transport route modules on both sides, wherein, in the two-sided route section the guiding sides of transport route modules are arranged on the two sides facing each other, wherein the at least two transport route modules each have on a respective guiding side a starting point and an ending point, which are situated on grid corner of an (a×a) grid having a predetermined grid length a and grid coordinates (p, q), wherein p, q are whole numbers, wherein, in the two-sided route section, in a transverse direction between the at least two transport route modules, an intermediate space is provided and the transport unit is arranged at least partially in the intermediate space, whereby midway of the intermediate space in the transverse direction, a movement path is formed which the transport unit follows when moving in the longitudinal direction by the guidance on the transport route modules and the movement path is arranged by the arrangement of the transport route modules in the transverse direction at a distance of (r·a) from the starting point and ending point, wherein r is an odd, whole number, wherein at least one transport route module is designed as a 90° curve with one of an outward guiding side, with a starting point or ending point at the grid coordinates $p=q=0$ and the ending point or starting point at the grid coordinates $p=(L-r)$ and preferably $q \neq 0$ or an inward guiding side, with a starting point or ending point at the coordinates $p=q=0$ and the ending point or starting point at the grid coordinates $p=(L+r)$ and $q \neq 0$.

4. The transport route according to claim 3, wherein at least one of:

for the outward guiding side, the starting point or ending point is at the grid coordinates $p=q=0$ and the ending point or starting point is at the grid coordinates $p=(L-r)$ and $q=(L-r)$, or for the inward guiding side, the starting point or ending point is at the coordinates $p=q=0$ and the ending point or starting point is at the grid coordinates $p=(L+r)$ and $q=(L+r)$.

5. A transport route of a long stator linear motor along which a transport unit of the long stator linear motor is movable in a longitudinal direction, comprising:

at least two transport route modules that are arranged adjacent to each other in longitudinal direction, wherein each of the at least two transport route modules forms a guiding side on a side of the transport route module lying in a transverse direction oriented transverse to the longitudinal direction and the transport unit is mounted in a guided manner on the guiding side and is arranged to be movable in the longitudinal direction on the guiding side, and at least one of a single-sided route section having transport route modules on only one side or a two-sided route section having transport route modules on both sides, wherein, in the two-sided route section, the guiding sides of transport route modules are arranged on the two sides facing each other, wherein the at least two transport route modules each have on a respective guiding side a starting point and an ending point, which are situated on grid corner of an (a×a) grid having a predetermined grid length a and grid coordinates (p, q), wherein p, q are whole numbers, wherein, in the two-sided route section, in a transverse direction between the at least two transport route modules, an intermediate space is provided and the transport unit is arranged at least partially in the intermediate space, whereby midway of the intermediate space in the transverse direction, a movement path is formed which the transport unit follows when moving in the longitudinal direction by the guidance on the transport route modules and the movement path is arranged by the arrangement of the transport route modules in the transverse direction at a distance of (r·a) from the starting point and ending point, wherein r is an odd, whole number, wherein at least one transport route module is designed as a 180° curve with one of an outward guiding side, with a starting point or ending point at the grid coordinates $p=q=0$ and the ending point or starting point at the grid coordinates $p=0$ and $q=(L-2r)$ or an inward guiding side with a starting point or ending point at the grid coordinates $p=q=0$ and the ending point or starting point at the grid coordinates $p=0$ and $q=(L+2r)$.

* * * * *